US012802246B2

(12) United States Patent
Leng et al.

(10) Patent No.: US 12,802,246 B2
(45) Date of Patent: Nov. 17, 2026

(54) MULTIMODAL FUSION-BASED PRECISE REGISTRATION METHOD FOR ADDITIVE MANUFACTURING (AM)

(71) Applicant: GUANGDONG UNIVERSITY OF TECHNOLOGY, Guangzhou (CN)

(72) Inventors: Jiewu Leng, Guangzhou (CN); Junxing Xie, Guangzhou (CN); Yuanwei Zhong, Guangzhou (CN); Zisheng Lin, Guangzhou (CN); Keyou Zheng, Guangzhou (CN); Rongjie Li, Guangzhou (CN); Caiyu Xu, Guangzhou (CN); Kailin Xu, Guangzhou (CN); Qiang Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 240 days.

(21) Appl. No.: 18/669,183

(22) Filed: May 20, 2024

(65) Prior Publication Data

US 2025/0292418 A1 Sep. 18, 2025

(30) Foreign Application Priority Data

Mar. 14, 2024 (CN) ......................... 202410291316.4

(51) Int. Cl.
*G06K 9/00* (2022.01)
*G06T 7/38* (2017.01)
(Continued)

(52) U.S. Cl.
CPC ................ *G06T 7/38* (2017.01); *G06V 10/26* (2022.01); *G06V 10/993* (2022.01); *G06T 2207/10081* (2013.01)

(58) Field of Classification Search
CPC ... G06T 7/38; G06T 2207/10081; G06T 7/30; G06T 7/33; G06T 7/0004; G06T 7/001;
(Continued)

(56) References Cited

U.S. PATENT DOCUMENTS 10,740,880 B2 * 8/2020 Paik .......................... G06T 5/73
11,244,451 B1 * 2/2022 Min ....................... A61B 6/504
(Continued)

OTHER PUBLICATIONS

Oster, Simon, et al. "A deep learning framework for defect prediction based on thermographic in-situ monitoring in laser powder bed fusion." Journal of Intelligent Manufacturing 35.4 (2024): 1687-1706. (Year: 2024).*
(Continued)

*Primary Examiner* — Avinash Yentrapati

(57) ABSTRACT

A multimodal fusion-based precise registration method for additive manufacturing (AM), includes: simultaneously collecting thermogram data and X-ray computed tomography (XCT) reference data; preprocessing the collected data; performing image registration; establishing a machine learning model; completing training to obtain a trained machine learning model; registering a thermogram dataset and an XCT reference dataset by using the trained machine learning model, to obtain a pre-registration result; and evaluating the machine learning model using a performance evaluation function; and if the evaluation is successful, using the pre-registration result as a final registration result; or if the evaluation is unsuccessful, re-training the machine learning model. The present disclosure integrates different types of sensor data and evaluates the machine learning model using the performance evaluation function, so as to register the thermogram dataset and the XCT reference dataset by using a high-precision machine learning model.

6 Claims, 1 Drawing Sheet

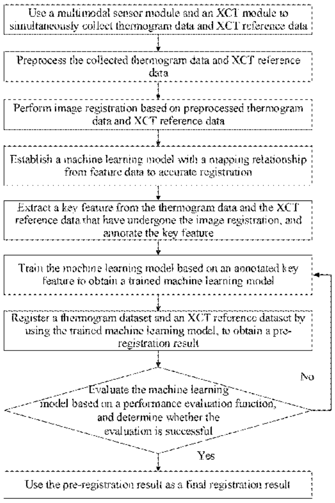

(51) Int. Cl.
*G06V 10/26* (2022.01)
*G06V 10/98* (2022.01)

(58) Field of Classification Search
CPC . G06T 2207/10048; G06T 2207/20081; G06T 2207/20084; G06V 10/26; G06V 10/993; G06V 10/80; G06V 10/22; G06V 10/462; G06N 20/00
See application file for complete search history.

(56) References Cited

U.S. PATENT DOCUMENTS

| | | | | |
|---|---|---|---|---|
| 11,350,899 | B2 * | 6/2022 | Min | A61B 6/032 |
| 11,553,969 | B1 * | 1/2023 | Lang | A61B 34/10 |
| 2016/0035093 | A1 * | 2/2016 | Kateb | A61B 5/0035<br>382/131 |
| 2017/0076438 | A1 * | 3/2017 | Kottenstette | G06F 18/2413 |
| 2018/0042565 | A1 * | 2/2018 | Wilson | A61B 5/33 |
| 2018/0270474 | A1 * | 9/2018 | Liu | A61B 1/00006 |
| 2019/0347790 | A1 * | 11/2019 | Lee | A61B 10/0041 |
| 2024/0161423 | A1 * | 5/2024 | Sholl | G06V 10/82 |

OTHER PUBLICATIONS

Velesaca, Henry O., et al. "Multimodal image registration techniques: a comprehensive survey." Multimedia Tools and Applications 83.23 (2024): 63919-63947. (Year: 2024).*

* cited by examiner

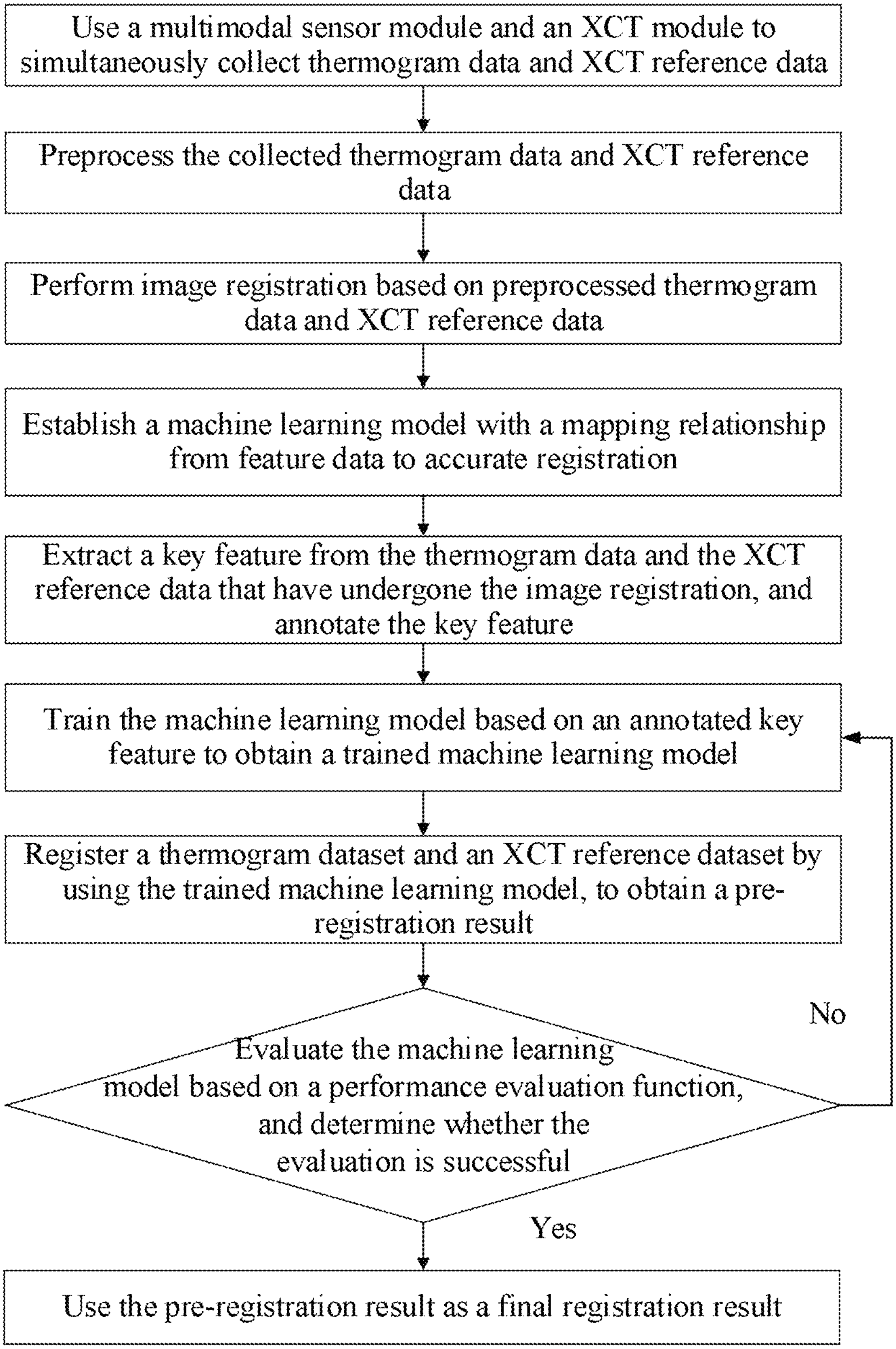
Use a multimodal sensor module and an XCT module to simultaneously collect thermogram data and XCT reference data
Preprocess the collected thermogram data and XCT reference data
Perform image registration based on preprocessed thermogram data and XCT reference data
Establish a machine learning model with a mapping relationship from feature data to accurate registration
Extract a key feature from the thermogram data and the XCT reference data that have undergone the image registration, and annotate the key feature
Train the machine learning model based on an annotated key feature to obtain a trained machine learning model
Register a thermogram dataset and an XCT reference dataset by using the trained machine learning model, to obtain a pre-registration result
Evaluate the machine learning model based on a performance evaluation function, and determine whether the evaluation is successful
No
Yes
Use the pre-registration result as a final registration result

MULTIMODAL FUSION-BASED PRECISE REGISTRATION METHOD FOR ADDITIVE MANUFACTURING (AM)

CROSS-REFERENCE TO RELATED APPLICATIONS

This application claims priority to Chinese Patent Application No. 202410291316.4 with a filing date of May 14, 2024. The content of the aforementioned application, including any intervening amendments thereto, is incorporated herein by reference.

TECHNICAL FIELD

The present disclosure relates to the technical field of additive manufacturing (AM), and in particular, to a multimodal fusion-based precise registration method for AM.

BACKGROUND

When a standard component is processed by means of AM, an irregular phenomenon such as an internal pore, a crack, or surface roughness has a negative impact on quality of a final component. Poor process parameterization, such as a scanning speed and laser power, can result in an irregularity of a workpiece. A registration function can be obtained by performing spatial transformation on a motion image registered to a fixed image. Accuracy of registration is crucial for evaluating measurement uncertainty.

In the context of predicting internal porosity based on sensor data, a key to achieving successful prediction by applying a machine learning algorithm relies on accurate space allocation between a sensor signal and porosity information. In laser powder bed fusion (L-PBF), accurate registration is particularly important due to an irregular microsize. In addition, different data formats and dimensions caused by different measurement methods further make the registration more challenging.

Generally, in L-PBF-based AM, accurate registration between thermal imaging-based in-situ monitoring data and X-ray computed tomography (XCT) reference data is crucial for defect prediction. This registration process not only helps to develop a precise prediction model, but also helps to guarantee manufacturing quality of the final component.

In an L-PBF-based AM process, accurate registration based on a single sensor is considered a defect detection method. Although the accurate registration method based on the single sensor can quickly obtain a feedback on a processing quality of a surface of the standard component in a processing process, there is no in-depth research on directly applying this method. The accurate registration method based on the single sensor can ensure timely collection of printed data of a surface layer of a standard component being processed. However, generally, printing of each layer in the L-PBF-based AM process may affect porosity and molten pool statuses of lower four or five layers of the component. Therefore, the accurate registration method based on the single sensor is difficult to comprehensively detect continuous changes in a pore status and a molten pool status of the standard component during processing, and cannot effectively evaluate an actual defect and actual quality of the standard component after the standard component is processed.

SUMMARY OF PRESENT INVENTION

An objective of the present disclosure is to overcome the shortcomings in the prior art and provide a multimodal fusion-based precise registration method for AM. The method integrates different types of sensor data and evaluates a machine learning model based on a performance evaluation function, so as to register a thermogram dataset and an XCT reference dataset by using a high-precision machine learning model. This improves accuracy of the registration between the thermogram dataset and the XCT reference dataset, and ensures that the thermogram dataset and the XCT reference dataset can work effectively together in a multimodally integrated standard component processing platform.

To achieve the above objective, the present disclosure provides the following technical solutions.

A multimodal fusion-based precise registration method for AM includes:

- S1, using a multimodal sensor module and an XCT module to simultaneously collect thermogram data and XCT reference data;
- S2, preprocessing the collected thermogram data and XCT reference data;
- S3, performing image registration using preprocessed thermogram data and XCT reference data;
- S4, establishing a machine learning model with a mapping relationship from feature data to accurate registration;
- S5, extracting a key feature from the thermogram data and the XCT reference data that have undergone the image registration, and annotating the key feature;
- S6, training the machine learning model using an annotated key feature to obtain a trained machine learning model;
- S7, registering a thermogram dataset and an XCT reference dataset by using the trained machine learning model, to obtain a pre-registration result; and
- S8, evaluating the machine learning model using a performance evaluation function; and if the evaluation is successful, using the pre-registration result as a final registration result; or if the evaluation is unsuccessful, performing the step S6 to re-train the machine learning model.

In one embodiment, the preprocessing the collected thermogram data and XCT reference data includes: denoising, normalization, spatial alignment, outlier handling, smoothing, and data format unification.

In one embodiment, the image registration includes preliminary registration and non-rigid registration, the preliminary registration includes: extracting a feature point or a feature region from the thermogram data and the XCT reference data, and achieving preliminary alignment through feature matching and transformation estimation; and the non-rigid registration includes: considering shape change and deformation of a component, and capturing and correcting an actual change of the component in a processing process more accurately through shape change field estimation, deformation field application, optimization, and final registration.

In one embodiment, the performance evaluation function is specifically as follows:

$$\text{Performance} = \omega_1 \times \text{Registration Consistency Metric} + \omega_2 \times \text{Registration Accuracy} + \omega_3 \times \text{Registration Coverage} + \omega_4 \times \text{Registration Completeness Score} + \omega_5 \times \text{Geometric Alignment Score} + \omega_6 \times \text{Integrated\_data\_factor}$$

-continued $$\text{subject to:}\begin{cases}\text{Registration Consistency Metric} > 0\\ \text{Registration Accuracy} > 0\\ \text{Registration Coverage} > 0\\ \text{Registration Completeness Score} > 0\\ \text{Geometric Alignment Score} > 0\\ \text{Integrated\_data\_factor} > 0\end{cases}$$

where Performance represents a total comprehensive evaluated value; $\omega_1$, $\omega_2$, $\omega_3$, $\omega_4$, $\omega_5$, and $\omega_6$ respectively represent corresponding weights of parameters;

Registration Consistency Metric is an indicator used to evaluate consistency and stability of a registration algorithm on different datasets or time points;

Registration Accuracy is an indicator used to measure accuracy of an image registration process, and is used to evaluate a precision degree of alignment which is a degree of approximation between an obtained registration result and real or ideal registration;

Registration Coverage is used to measure a proportion of a region that is correctly aligned in a registered image;

Registration Completeness Score is used to evaluate quality of the image registration more comprehensively by considering both accuracy of the registration and a coverage degree of an entire image, such that an evaluation result is more practical and applicable;

Geometric Alignment Score comprehensively considers a degree of geometric alignment of the registered image, including accuracy of rotation, translation, and scaling, and is evaluated by calculating a geometric transformation error between the registered image and a reference image; and Integrated_data_factor represents a comprehensive indicator of a working environment, including a temperature, humidity, atmospheric pressure, and other environmental parameters of the working environment.

In one embodiment, the image is divided into different regions or grids, a proportion of a correctly aligned pixel in each region or grid is calculated, and then an average value of the proportions is taken as the registration coverage.

In one embodiment, the comprehensive indicator Integrated_data_factor of the working environment is calculated according to a following formula:

$$\text{Integrated\_data\_factor} = \omega_t \times \text{Normalized\_Temperature} + \omega_h \times \text{Normalized\_Humidity} + \omega_p \times \text{Normalized\_Pressure}$$

where Normalized_Temperature represents a normalized temperature of the working environment;

Normalized_Humidity represents normalized humidity of the working environment;

Normalized_Pressure represents normalized atmospheric pressure of the working environment; and $\omega_t$, $\omega_h$, and $\omega_p$ respectively represent weights of the temperature, the humidity, and the atmospheric pressure of the working environment in comprehensive evaluation.

Compared with the prior art, the principles and advantages of the present disclosure are as follows:

1. The technical solutions of the present disclosure integrate different types of sensor data and evaluate the machine learning model using the performance evaluation function, so as to register the thermogram dataset and the XCT reference dataset by using a high-precision machine learning model. This improves accuracy of the registration between the thermogram dataset and the XCT reference dataset, and ensures that the thermogram dataset and the XCT reference dataset can work effectively together in a multimodally integrated standard component processing platform.

2. The image registration includes the preliminary registration and the non-rigid registration. Upon these two key steps, a gradual transition from initial data to a higher-precision registration result can be achieved, providing more accurate inputs for a subsequent machine learning model. In this way, accuracy of defect prediction in L-PBF-based AM is improved.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show merely some embodiments of the present disclosure, and a person of ordinary skill in the art may still derive other drawings from these drawings without creative efforts.

FIG. 1 is a schematic flowchart of a multimodal fusion-based precise registration method for AM according to the present disclosure.

DETAILED DESCRIPTION OF THE EMBODIMENTS

The present disclosure is described in further detail below according to a specific embodiment.

As shown in FIG. 1, a multimodal fusion-based precise registration method for AM according to an embodiment includes the following steps:

In S1, a multimodal sensor module and an XCT module are used to simultaneously collect thermogram data and XCT reference data.

In this step, sensor calibration is performed before the collection to ensure that an output matches an actual scene. Key environmental parameters are recorded, and it is ensured that sensors collect data synchronously in terms of time. When a sample is prepared, its position and posture are considered, and continuous collection is conducted to capture a dynamic change throughout a manufacturing process.

In S2, the collected thermogram data and XCT reference data are preprocessed, which specifically includes: denoising, normalization, spatial alignment, outlier handling, smoothing, data format unification, and other operations to ensure data quantity and consistency. These steps are well designed and executed to provide a high-quality data foundation for subsequent registration and analysis, thereby laying a solid foundation for training a machine learning algorithm and optimizing system performance.

In S3, image registration is performed using preprocessed thermogram data and XCT reference data.

The image registration includes preliminary registration and non-rigid registration.

The preliminary registration includes: extracting a feature point or a feature region from the thermogram data and the XCT reference data, and achieving preliminary alignment through feature matching and transformation estimation.

The non-rigid registration includes: considering shape change and deformation of a component, and capturing and correcting an actual change of the component in a processing process more accurately through shape change field estimation, deformation field application, optimization, and final registration.

In S4, a machine learning model with a mapping relationship from feature data to accurate registration is established.

This step specifically includes: selecting an appropriate machine learning algorithm, obtaining a training set and a validation set through division, designing a model architecture, selecting a loss function, and conducting model training and hyperparameter adjustment, so as to establish the machine learning model with the mapping relationship from the feature data to the accurate registration.

In S5, a key feature is extracted from the thermogram data and the XCT reference data that have undergone the image registration, and is annotated.

In S6, the machine learning model is trained using an annotated key feature to obtain a trained machine learning model.

In S7, a thermogram dataset and an XCT reference dataset are registered by using the trained machine learning model, to obtain a pre-registration result.

In S8, the machine learning model is evaluated using a performance evaluation function. If the evaluation is successful, the pre-registration result is used as a final registration result. If the evaluation is unsuccessful, the step S6 is performed to re-train the machine learning model.

The performance evaluation function is specifically as follows:

$$\text{Performance} = \omega_1 \times \text{Registration Consistency Metric} + \omega_2 \times \text{Registration Accuracy} + \omega_3 \times \text{Registration Coverage} + \omega_4 \times \text{Registration Completeness Score} + \omega_5 \times \text{Geometric Alignment Score} + \omega_6 \times \text{Integrated\_data\_factor}$$

$$\text{subject to: } \begin{cases} \text{Registration Consistency Metric} > 0 \\ \text{Registration Accuracy} > 0 \\ \text{Registration Coverage} > 0 \\ \text{Registration Completeness Score} > 0 \\ \text{Geometric Alignment Score} > 0 \\ \text{Integrated\_data\_factor} > 0 \end{cases}$$

In the above formula, Performance represents a total comprehensive evaluated value; $\omega_1$, $\omega_2$, $\omega_3$, $\omega_4$, $\omega_5$, and $\omega_6$ respectively represent corresponding weights of various parameters; and Registration Consistency Metric is an indicator used to evaluate consistency and stability of a registration algorithm on different datasets or time points.

Registration Accuracy is an indicator used to measure accuracy of an image registration process, and is used to evaluate a precision degree of alignment which is a degree of approximation between an obtained registration result and real or ideal registration.

Registration Coverage is used to measure a proportion of a region that is correctly aligned in a registered image.

Registration Completeness Score is used to evaluate quality of the image registration more comprehensively by considering both accuracy of the registration and a coverage degree of an entire image, such that an evaluation result is more practical and applicable.

Geometric Alignment Score comprehensively considers a degree of geometric alignment of the registered image, including accuracy of rotation, translation, and scaling, and is evaluated by calculating a geometric transformation error between the registered image and a reference image.

Integrated_data_factor represents a comprehensive indicator of a working environment, including a temperature, humidity, atmospheric pressure, and other environmental parameters of the working environment.

In the above description, the comprehensive indicator Integrated_data_factor of the working environment is calculated according to a following formula:

$$\text{Integrated\_data\_factor} = \omega_t \times \text{Normalized\_Temperature} + \omega_h \times \text{Normalized\_Humidity} + \omega_p \times \text{Normalized\_Pressure}$$

In the above formula, Normalized_Temperature represents a normalized temperature of the working environment; Normalized_Humidity represents normalized humidity of the working environment; Normalized_Pressure represents normalized atmospheric pressure of the working environment; and $\omega_t$, $\omega_h$, and $\omega_p$ respectively represent weights of the temperature, the humidity, and the atmospheric pressure of the working environment in comprehensive evaluation.

This embodiment integrates different types of sensor data and evaluates the machine learning model using the performance evaluation function, so as to register the thermogram dataset and the XCT reference dataset by using a high-precision machine learning model. This improves accuracy of the registration between the thermogram dataset and the XCT reference dataset, and ensures that the thermogram dataset and the XCT reference dataset can work effectively together in a multimodally integrated standard component processing platform.

More specifically, the image registration includes the preliminary registration and the non-rigid registration. Upon these two key steps, a gradual transition from initial data to a higher-precision registration result can be achieved, providing more accurate inputs for a subsequent machine learning model. In this way, accuracy of defect prediction in L-PBF-based AM is improved.

The above described are only preferred embodiments of the present disclosure, and are not intended to limit the implementation scope of the present disclosure. Therefore, all changes made in accordance with the shapes and principles of the present disclosure should fall within the protection scope of the present disclosure.

What is claimed is:

1. A multimodal fusion-based registration method for additive manufacturing (AM), comprising:

S1, using a multimodal sensor module and an X-ray computed tomography (XCT) module to simultaneously collect thermogram data and XCT reference data;

S2, preprocessing the collected thermogram data and XCT reference data;

S3, performing image registration using preprocessed thermogram data and XCT reference data;

S4, establishing a machine learning model configured to receive feature data extracted from the thermogram data and the XCT reference data, and to output registration transformation information for aligning the thermogram data with the XCT reference data, wherein the registration transformation information comprises at least one of translation parameters, rotation parameters, and scaling parameters;

S5, extracting a key feature from the thermogram data and the XCT reference data that have undergone the image registration, and annotating the key feature;

S6, training the machine learning model using an annotated key feature to obtain a trained machine learning model;

S7, registering a thermogram dataset and an XCT reference dataset by using the trained machine learning model, to obtain a pre-registration result; and S8, evaluating the machine learning model using a performance evaluation function;

and when the evaluation is successful, using the pre-registration result as a final registration result; or when the evaluation is unsuccessful, performing the step S6 to re-train the machine learning model.

2. The multimodal fusion-based registration method for AM according to claim 1, wherein the preprocessing the collected thermogram data and XCT reference data comprises: denoising, normalization, spatial alignment, outlier handling, smoothing, and data format unification.

3. The multimodal fusion-based registration method for AM according to claim 1, wherein the image registration comprises preliminary registration and non-rigid registration, the preliminary registration comprises:

extracting a feature point or a feature region from the thermogram data and the XCT reference data, and achieving preliminary alignment through feature matching and transformation estimation; and the non-rigid registration comprises:

considering shape change and deformation of a component, and capturing and correcting an actual change of the component in a processing process more accurately through shape change field estimation, deformation field application, optimization, and final registration.

4. The multimodal fusion-based registration method for AM according to claim 1, wherein the performance evaluation function is specifically as follows:

$$\text{Performance} = \omega_1 \times \text{Registration Consistency Metric} + \omega_2 \times \text{Registration Accuracy} + \omega_3 \times \text{Registration Coverage} + \omega_4 \times \text{Registration Completeness Score} + \omega_5 \times \text{Geometric Alignment Score} + \omega_6 \times \text{Integrated\_data\_factor}$$

$$\text{subject to: } \begin{cases} \text{Registration Consistency Metric} > 0 \\ \text{Registration Accuracy} > 0 \\ \text{Registration Coverage} > 0 \\ \text{Registration Completeness Score} > 0 \\ \text{Geometric Alignment Score} > 0 \\ \text{Integrated\_data\_factor} > 0 \end{cases}$$

wherein Performance represents a total comprehensive evaluated value; $\omega_1$, $\omega_2$, $\omega_3$, $\omega_4$, $\omega_5$, and $\omega_6$ respectively represent corresponding weights of parameters;

Registration Consistency Metric is an indicator used to evaluate consistency and stability of a registration algorithm on different datasets or time points;

Registration Accuracy is an indicator used to measure accuracy of an image registration process, and is used to evaluate a accurate degree of alignment which is a degree of approximation between an obtained registration result and real or ideal registration;

Registration Coverage is used to measure a proportion of a region that is correctly aligned in a registered image;

Registration Completeness Score is used to evaluate quality of the image registration more comprehensively by considering both accuracy of the registration and a coverage degree of an entire image, such that an evaluation result is more practical and applicable;

Geometric Alignment Score comprehensively considers a degree of geometric alignment of the registered image, comprising accuracy of rotation, translation, and scaling, and is evaluated by calculating a geometric transformation error between the registered image and a reference image; and Integrated_data_factor represents a comprehensive indicator of a working environment, comprising a temperature, humidity, and atmospheric pressure.

5. The multimodal fusion-based registration method for AM according to claim 4, wherein the image is divided into different regions or grids, a proportion of a correctly aligned pixel in each region or grid is calculated, and then an average value of proportions is taken as the registration coverage.

6. The multimodal fusion-based registration method for AM according to claim 4, wherein the comprehensive indicator Integrated_data_factor of the working environment is calculated according to a following formula:

$$\text{Integrated\_data\_factor} = \omega_t \times \text{Normalized\_Temperature} + \omega_h \times \text{Normalized\_Humidity} + \omega_p \times \text{Normalized\_Pressure}$$

Normalized_Temperature represents a normalized temperature of the working environment;

Normalized_Humidity represents normalized humidity of the working environment;

Normalized_Pressure represents normalized atmospheric pressure of the working environment; and $\omega_t$, $\omega_h$, and $\omega_p$ respectively represent weights of the temperature, the humidity, and the atmospheric pressure of the working environment in comprehensive evaluation.

* * * * *